(12) United States Patent
Mine et al.

(10) Patent No.: US 8,379,992 B2
(45) Date of Patent: Feb. 19, 2013

(54) COMPUTER-AIDED IMAGE INTERPRETATION METHOD AND DEVICE

(75) Inventors: Ryuji Mine, Kokubunji (JP); Yoriko Kazama, Kokubunji (JP); Nobuhiro Ishimaru, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 994 days.

(21) Appl. No.: 12/416,303

(22) Filed: Apr. 1, 2009

(65) Prior Publication Data

US 2009/0252424 A1 Oct. 8, 2009

(30) Foreign Application Priority Data

Apr. 3, 2008 (JP) ................. 2008-097127

(51) Int. Cl.
*G06K 9/62* (2006.01)
*G06K 9/66* (2006.01)
*G06K 9/64* (2006.01)

(52) U.S. Cl. .............. 382/224; 381/190; 381/278
(58) Field of Classification Search .......... 382/103, 382/170, 173, 190, 206, 278, 291, 305, 312, 382/224, 293; 348/207.99, 739
See application file for complete search history.

(56) References Cited

U.S. PATENT DOCUMENTS

| | | | | | |
|---|---|---|---|---|---|
| 4,026,631 | A | * | 5/1977 | Erb ........................ | 359/378 |
| 5,675,661 | A | * | 10/1997 | Richman et al. ............ | 382/104 |
| 6,597,800 | B1 | * | 7/2003 | Murray et al. ............. | 382/103 |
| 7,203,342 | B2 | * | 4/2007 | Pedersen .................. | 382/109 |
| 8,055,026 | B2 | * | 11/2011 | Pedersen .................. | 382/109 |

FOREIGN PATENT DOCUMENTS

| | | |
|---|---|---|
| JP | 2001-307106 | 11/2001 |
| JP | 2001-338292 | 12/2001 |

* cited by examiner

*Primary Examiner* — Kanjibhai Patel
(74) *Attorney, Agent, or Firm* — Antonelli, Terry, Stout & Kraus, LLP.

(57) ABSTRACT

A computer-aided image interpretation method and a device thereof to easily obtain an accurate image interpretation result are provided. An automatic classification means of the image interpretation device performs automatic classification by one of spectral characteristics, radiometric characteristics, diffuse characteristics, textures and shapes, or combinations thereof and accumulates data to an interpretation result database, for plural features of the same kind obtained by interpreting a remote sensing image obtained with an observation sensor. A means for extracting candidate of modification of interpretation result extracts the candidate of modification of interpretation result by comparing likelihoods that are the automatic classification results. A reinterpretation is performed for the candidate of modification of interpretation, and an interpretation result database is updated by an interpretation result update means. As a result, modification of the interpretation work can be efficiently performed.

12 Claims, 15 Drawing Sheets

| | | FEATURE ID | | | |
|---|---|---|---|---|---|
| | | 1 | 2 | 3 | 4 |
| FEATURE ID | 1 | 1.0 | 0.9 | 0.8 | 0.8 |
| | 2 | 0.9 | 1.0 | 0.8 | 0.4 |
| | 3 | 0.8 | 0.8 | 1.0 | 0.9 |
| | 4 | 0.8 | 0.4 | 0.9 | 1.0 |

COMPUTER-AIDED IMAGE INTERPRETATION METHOD AND DEVICE

CLAIM OF PRIORITY

The present application claims priority from Japanese patent application JP2008-097127 filed on Apr. 3, 2008, the content of which is hereby incorporated by reference into this application.

BACKGROUND OF THE INVENTION

1. Field of the Invention

The present invention relates to an image analysis using a remote sensing image, and in particular, a computer-aided image interpretation technology.

2. Description of the Related Art

Various features exist in images (hereinafter described as the remote sensing image) shot by platforms such as aircrafts, helicopters, balloons, artificial satellites, and etc. It is described as a visual interpretation, an image interpretation or simply an interpretation, to distinguish these features by manpower.

It is possible to obtain various information by visual interpretation of the remote sensing image. For example, the remote sensing image obtained from the sky in the region struck by an earthquake, a fire, etc. is very useful to grasp the situation of damage due to the characteristics of wide area and the volume of information. Moreover, it is possible to regularly observe the amount of marine traffic by interpreting the remote sensing image obtained by taking a picture of harbors and high seas. Moreover, a road map and a railway map can be made by interpreting the remote sensing image obtained by taking a picture of the region including a road and a railway. Moreover, the construction situation of the road can be understood by taking pictures of the same region several times by staggering the time of taking pictures, obtaining the remote sensing image, and extracting the difference between those images. In addition, it can be used for the index to calculate urbanization rate, farmland rate, and etc. by seeing the regularity degree of the structure of the features. Moreover, it can be used for fire simulation, transition of urbanization development, city planning, etc.

Such interpretation work is performed by displaying the remote sensing image on the display of a computer, visually interpreting the feature, superimposing the name of feature that shows the kind of individual feature on the remote sensing image, and filling it in. Alternatively, it is possible that the remote sensing image can be printed on a medium such as paper, so as to be visually interpreted, while the result can be filled in on the paper, and thereafter an interpretation result is digitized.

So far, the following methods have been proposed as a method to do such interpretation work efficiently. That is, there is a method of efficiently proceeding the interpretation work that uses the effect of the afterimage of a human's eye, by preparing the remote sensing image and the interpretation result for the remote sensing image, and alternately displaying (what is called, flicker-displaying) the image and the interpretation result at the time interval of several seconds (For example, see JP-A-2001-338292).

Moreover, a method of automatically classifying the feature in the remote sensing image (hereafter, automatic classification) is proposed referring to one of spectral characteristics, radiometric characteristics, and diffuse characteristics, textures and shapes or using the technologies in which these are combined (for example, JP-A-2001-307106). As the result of the automatic classification, it is understood which feature exists in which position of the remote sensing image. This result is used to replace the interpretation work. In the method disclosed in the above-mentioned document, the automatic classification with higher accuracy has been achieved by changing the extraction algorithm and the parameter of the feature in each kind of features. Moreover, a method is disclosed that obtains several classification results referring to several feature extraction algorithms, and are output in descending order of likelihood (accuracy) of the classification result at the end, when the kind of feature is not known.

BRIEF SUMMARY OF THE INVENTION

However, there is a possibility of providing a wrong kind of feature because humans perform the interpretation work of the feature. Confirming the interpretation result for the same remote sensing image and modifying it again can make the accuracy of the feature interpretation higher. The accuracy of the interpretation can be expected to increase gradually by repeating such revision work.

However, the range taken of a picture at a time by the platform is wide, and for example, the remote sensing image of which the picture has been taken with the artificial satellite might have a wide range of tens of kilometers×tens of kilometers. Thus, it takes a very long time to visually interpret such an image to every corner, which is a problem. Moreover, a lot of artificial satellites have been launched in recent years, and the remote sensing image that can be obtained has been increased. The image from several satellites might be used for interpretation of more accurate features, but there was a problem in that the amount of interpretation work increased as much as the number of artificial satellites. In addition, as the spatial resolution of the sensor mounted on the platform tends to improve, interpretation of the features become more accurate. But, if the image appropriate for the interpretation of the feature is expanded and displayed, it takes time to display a vast image on the display with limited size or to scroll the image, and working hours are increased.

Moreover, there has been a possibility of providing a different interpretation result of the same feature by the mistake in the work, since the interpretation result is manually provided for an individual feature in the method described in JP-A-2001-338292. In addition, there has been a possibility of missing the feature out.

Moreover, the automatic classification technology is used in the method described in JP-A-2001-307106. However, the automatic classification technology is not perfect, and the appearance of the feature in the remote sensing image might change greatly and the classification result might also change greatly, with variability characteristics of the sensor of the platform, the weather at the time of taking a picture, and the lighting condition of the location of taking a picture, etc. Therefore, there has been a problem in that the interpretation result is not consistent when the automatic classification result is substituted as the interpretation result.

The present invention aims to provide the computer-aided image interpretation method that solves these problems and the device thereof.

The disclosure of the invention to be disclosed in the present application for attaining the above-mentioned purpose will be made as follows.

First of all, the positions of individual features obtained by visual interpretation of the sensing image and the kinds of features are correlated to the positions in the sensing image. Next, the kinds of features are automatically classified from the sensing image, and the classification likelihoods and the positions are correlated. The computer-aided image interpretation method is provided in that the variation in the classification likelihoods obtained by the automatic classification is examined, a feature having a peculiar value is retrieved, the interpretation result for the feature that exists at the position is proposed as a candidate of modification of interpretation, and facilitates the modification of the interpretation work.

Moreover, the interpretation result obtained as a result of visual interpretation of the feature from the sensing image is correlated to the position in the sensing image, and stored. The automatic classification result of automatically classifying the features on the basis of the sensing image is correlated to the similarities or the likelihoods and the positions in the sensing image, and is stored. Therefore, the computer-aided image interpretation method is provided in which, as a result of automatic classification, the interpretation result is retrieved based on the positions of at least one or more features whose similarities are greatly different as compared with other features or whose likelihoods become below a threshold, and a feature with a different interpretation result, that is, a feature with high possibility of incorrect interpretation result, is extracted. In the computer-aided image interpretation method, the interpretation result of the feature is presented to a user as a candidate of modification of interpretation, and it is possible to facilitate the modification of the interpretation work.

In addition, the computer-aided image interpretation device that supports the interpretation of the features from the sensing image is composed of a memory unit, a processing unit, and a display unit. Moreover, the computer-aided image interpretation device is provided that the interpretation result that is a result of interpreting the feature is correlated to the position in the sensing image of the feature and the automatic classification result that is a result of automatically classifying the kind of feature from the sensing image in the processing unit is correlated to the similarity or the likelihood of the feature and the position in the sensing image of the feature and the results are stored as data, in the memory unit. The computer-aided image interpretation device is provided that the feature that becomes a candidate of modification of interpretation is extracted on the basis of these stored data, and is output to display unit as a candidate of modification of interpretation, in the processing unit.

Preferably, in the automatic classification, the feature is automatically classified from the image by one of spectral characteristics, radiometric characteristics, and diffuse characteristics, textures and shapes or by combinations thereof. It is needless to say that the means used for the automatic classification is not limited to spectral characteristics, radiometric characteristics, and diffuse characteristics, textures or shapes or combinations thereof.

According to the present invention, the ambiguity of visual interpretation by humans for the same feature can be reduced referring to the automatic classification technology for the feature, and the interpretation result with high accuracy can be easily obtained.

DETAILED DESCRIPTION OF THE INVENTION

Figure 1:
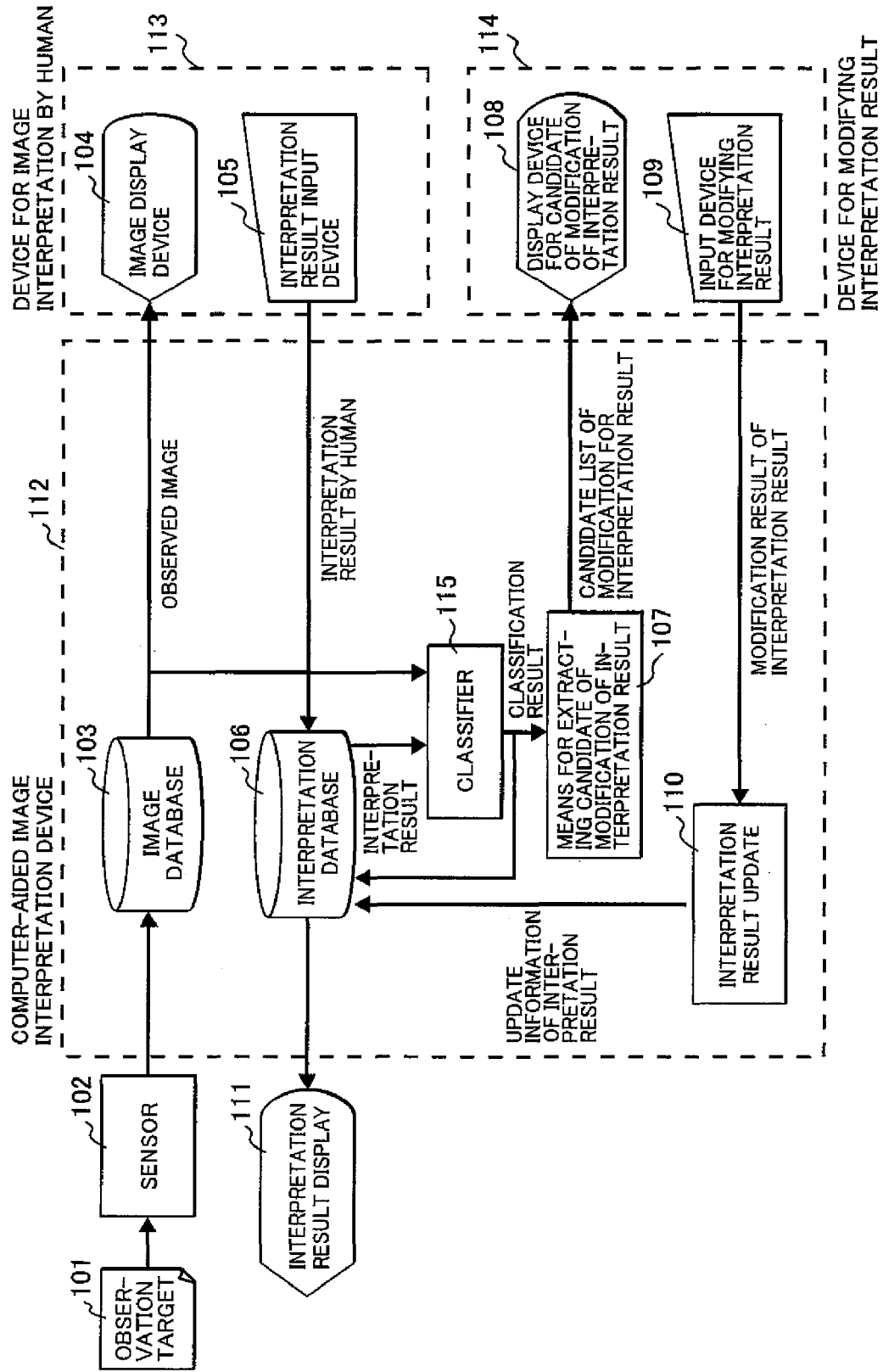
FIG. 1 is a block diagram of the computer-aided image interpretation device of a first embodiment.

Each embodiment of the present invention is described in detail referring to the drawing as follows. Here, "Feature" of the present invention represents the concept of the object that may exist on the ground regardless of whether the feature is an artificial object or a natural object, and indicates rivers, mountains, plants, roads, railways, bridges, buildings, aircrafts, ocean vessels, vehicles, and trains, and etc. Moreover, "Kind of feature" might be the sort of rivers, mountains, plants, roads, and railways, etc., and be the sort of asphalt roads and unpaved roads, etc. In particular, for the natural object of the latter, "Sort of feature" indicates the name of plants.

First Embodiment

In the first embodiment, it is described for the remote sensing image where the radiated and the reflected electromagnetic wave of the ground level is measured and recorded with sensors of platforms such as aircrafts, helicopters, balloons, and artificial satellites, etc. Moreover, the adaptive target of the present application is not limited to the remote sensing image taken a picture with sensors mounted on platforms. Thus, the present application is applicable to the sensing image, if the sensing image is the image taken picture of in various situations such as that the position and the date and time of observation of the observation sensor is previously known, and there is a certain distance between an observation target and a observation sensor.

FIG. 1 is a block diagram that depicts the first embodiment of the computer-aided image interpretation device. The computer-aided image interpretation device 112 obtains an observation signal from an observation sensor 102, and accumulates a sensing image to an image database 103. The computer-aided image interpretation device 112 is composed of a usual computer. The computer includes a memory unit memorizing a database of the image database 103, etc. and various programs and a central processing unit (CPU) where the programs are executed, etc. Moreover, a display, a keyboard, and a mouse, etc. that will be described later are attached to the computer. In addition, it is also possible that various databases are accumulated in the external memory unit that is the memory unit connected to the computer through a network.

The observation sensor 102 takes a picture of the observation targets such as the urban areas or sea areas for example, and outputs the observation image, the position of the observation sensor, the positions of the observation targets, and the observation dates and times. For example, the position of the observation sensor 102 can be expressed by the combination of three numerical values of latitude, longitude, and altitude. The method of acquiring the position of the observation sensor includes the method by GPS (Global Positioning System). The position of observation targets is obtained from the range of the region in which the observation sensor 102 took a picture and a relative position where the feature exists from the starting point of the photographic image by associating the latitude and the longitude of the feature. The range of the region of which the observation sensor took a picture can be expressed by the combination of four numerical values of northwest latitude and longitude in a rectangular shape, and southeast latitude and longitude in a rectangular shape, and the longitudes, if the range of a rectangular shape is assumed for example. The observation date and time can be achieved by reading the time of the clock built into the device to which the observation sensor 102 is mounted.

Even if taking a picture is performed based on the instruction of the user, it may be performed for every predetermined period in conformity to the predetermined rule. Moreover, the observation sensor 102 might be a passive type sensor like an optical sensor, and be an active type sensor such as synthetic aperture radar. Moreover, it is possible to adopt the configuration in which the image generation for each observation wavelength region is processed is acceptable with a hyper spectrum sensor.

Image display device 104 is a device that displays and outputs the image in the image database 103. The device 104 can be embodied referring to the display, etc. of the above-mentioned computer. An image interpretation result input device 105 is a device that inputs the result of visually interpreting the image to the interpretation result database 106. The device 105 can be embodied by an information input means of the computer, for example, a keyboard, a mouse, and a special input device, etc. The interpretation result of each image is stored in the interpretation result database 106. It is possible to retrieve the interpretation result and register the interpretation result by using the interpretation date and time, the name of feature and image ID, etc. as keys. The database 106 is also accumulated in the memory unit, etc. of the computer.

An automatic classification means 115 of the computer-aided image interpretation device 112 draws out a lag/long of area (area coordinates) that show the position of each feature interpreted from the interpretation result database 106, also draws out the image interpreted from the image database 103, automatically classifies the feature of the lag/long of area of the image, and outputs the automatic classification result of the feature.

A means for extracting candidate of modification of interpretation result 107 outputs the feature candidate with high possibility to which the result of the interpretation work is wrong, referring to the automatic classification result that is output and accumulated. The result is displayed in a display device for candidate of modification of interpretation result 108 of the above-mentioned display, etc. An interpreter makes modification by referring to an input device for modifying interpretation result 109 composed of the keyboard and the mouse, etc., when he or she sees the candidate, and wants to modify the interpretation result. An interpretation result update means 110 stores the modification result in the interpretation result database 106. Finally, the interpretation result can be referred to with an interpretation result display 111. Moreover, the automatic classification means 115, the means for extracting candidate of modification of interpretation result 107, and the interpretation result update means 110 are composed of the program executed in the CPU that is the processing unit of the above-mentioned computer, for example.

Figure 2:
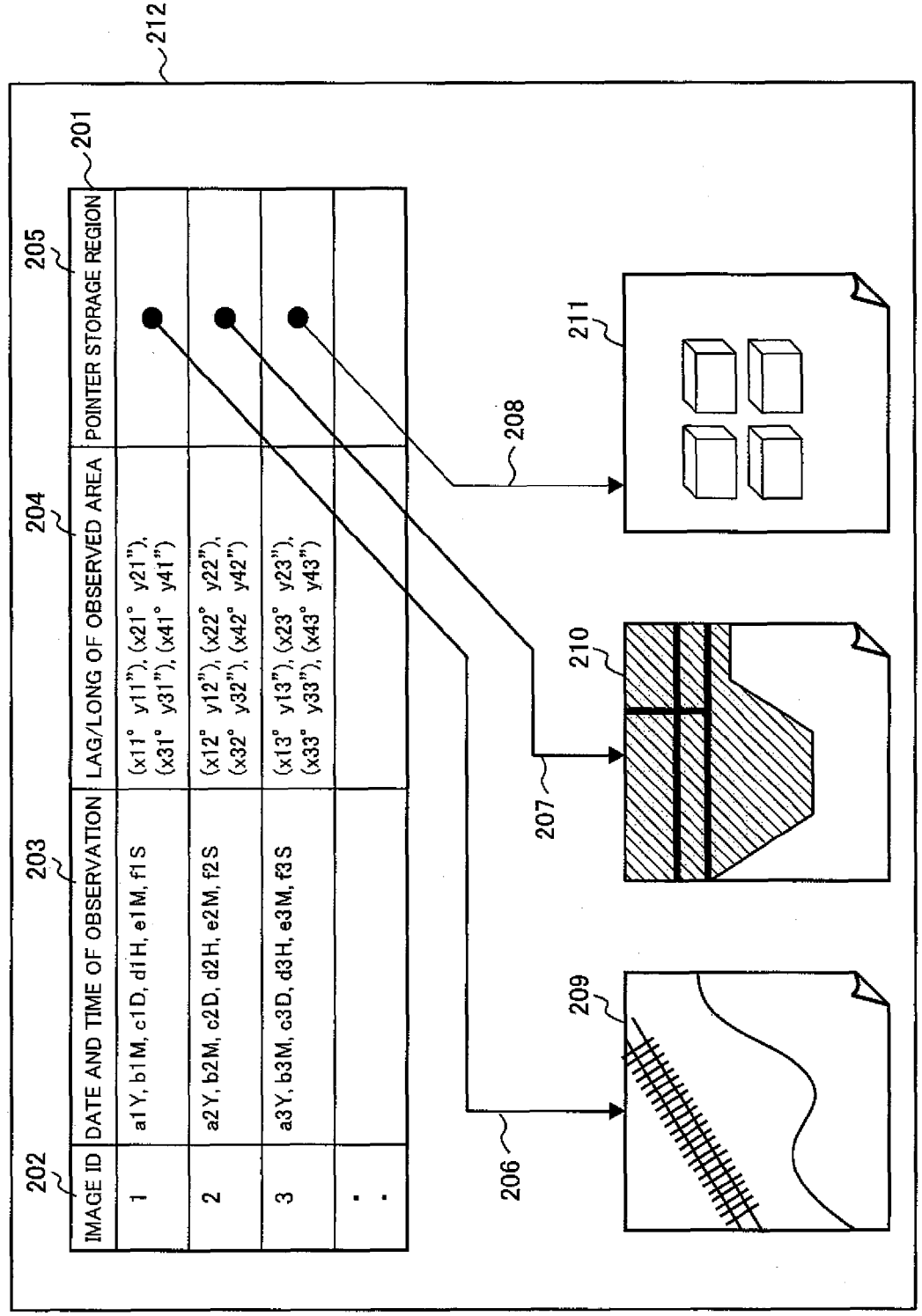
FIG. 2 is a drawing that depicts the exemplary configuration of the data structure of image database in the first embodiment.

FIG. 2 is a drawing that depicts the exemplary configuration of the data structure used in the image database 103 in the first embodiment. The image database is composed of an image management table 201 and image data 209, 210, 211, etc. roughly separately. A peculiar number of images are stored in an image ID 202 of the image management table 201. The date and time when the image is taken of a picture is stored in a date and time of observation 203. The range of taking a picture of the image is stored in a lag/long of observed area 204. It is expressible in the latitude and the longitude to the four corners of the observed area, as the method of expression of the observed area. The pointer storage region 205 stores the pointer to the image corresponding to the image ID 202. The role of pointers 206, 207 and 208 are to correlate each element in the image management table to the image data. That is, the image data can be referred to from the image ID by tracing this pointer. For example, the image whose image ID is 1 is correlated to the image data 209 by tracing the pointer 206.

Figure 3:
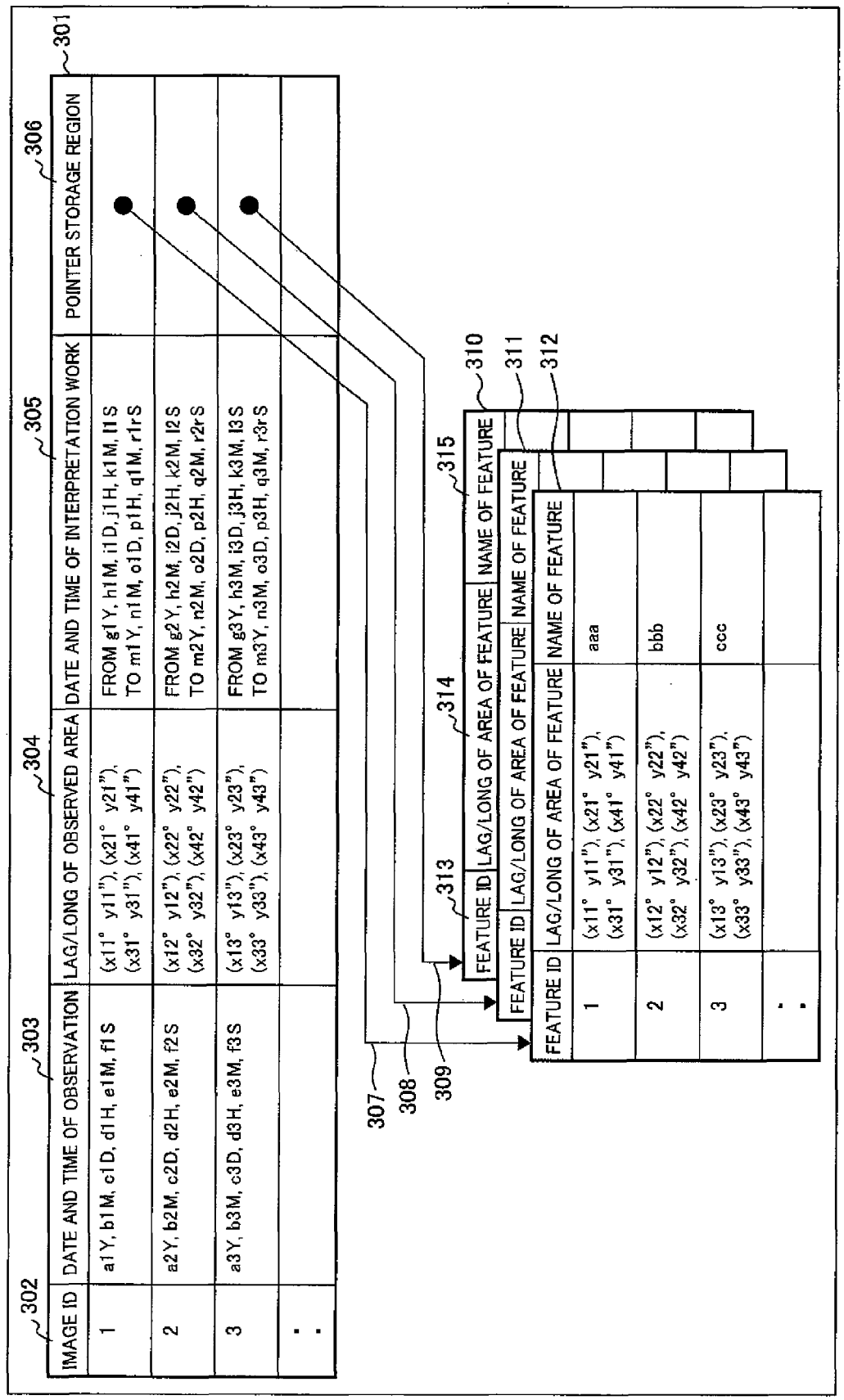
FIG. 3 is a drawing that depicts the exemplary configuration of the data structure of interpretation result database in the first embodiment.

FIG. 3 is a drawing that depicts the exemplary configuration of the data structure used by the interpretation result database 106 in the first embodiment. The interpretation result database is roughly composed of an interpretation result management table 301 and interpretation result table 310, 311 and 312, etc. A peculiar number of images are stored in the image ID 302 of the interpretation result management table 301. The range of taking of a picture the image which is the object of the interpretation is stored in the lag/long of observed area 304. It is expressible in the latitude and the longitude to the four corners of the observed area, as well as the lag/long of observed area 204 of FIG. 2. The date and time of the interpretation work 305 stores the date and time of starting and ending of the interpretation work. The pointers to interpretation result table 310, 311 and 312, etc. are stored in a pointer storage region 306 to the interpretation result table. Pointers 307, 308 and 309 play a role of correlating each element in the interpretation result management table to the interpretation result table. That is, the interpretation result data can be referred to from the image ID by tracing the pointer. For example, the image whose Image ID is 1 is correlated to the interpretation result table 312 by tracing the pointer 307. An ID of the feature is stored in a feature ID 313, and coordinates where the feature is located are stored in a lag/long of area of feature 314 and the name of feature that shows the kind of feature obtained as a result of the visual interpretation is stored in a name of feature 315, respectively.

Figure 15:
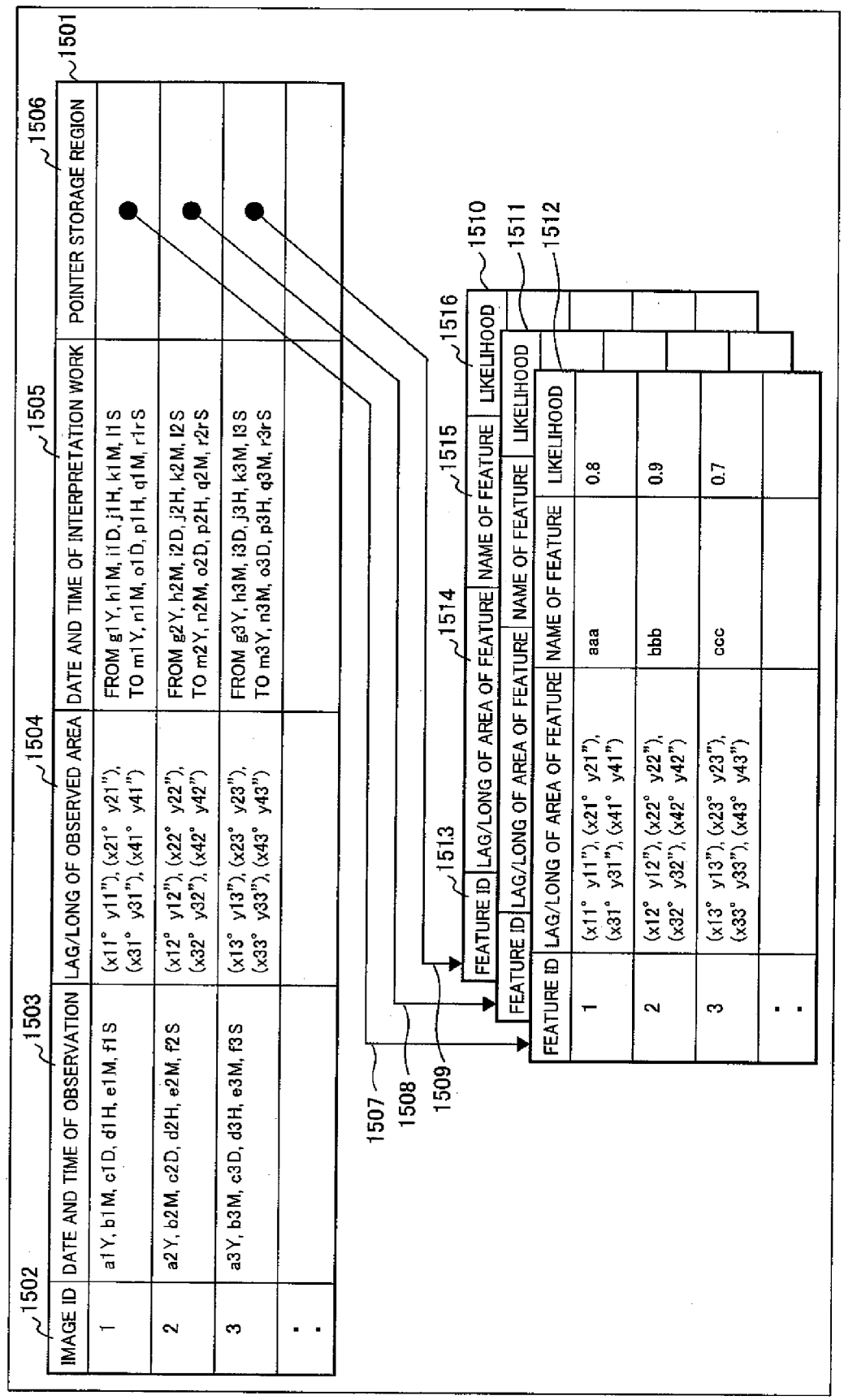
FIG. 15 is a drawing that depicts one example of the data structure of the automatic classification result of the first embodiment.

FIG. 15 is a drawing that depicts an exemplary configuration of the data structure of the automatic classification result output by an automatic classification means 115 in the first embodiment. The data structure of the automatic classification result has a structure to add a likelihood 1516 obtained as a result of the automatic classification means 115 to the interpretation result database 106 as described below. If the automatic classification result data is stored, it can be stored in the interpretation result database 106 by addition, or accumulated in the automatic classification result database independently installed (not shown). The automatic classification result is roughly composed of an automatic classification result management table 1501 and an automatic classification result table 1510.

A peculiar number of images are stored in the image ID 1502 of the automatic classification result management table 1501 as shown in the FIG. 15. The range of taking a picture of the image which is the object of the interpretation is stored in the lag/long of observed area 1504. It is expressible in the latitude and the longitude in the four corners of the observed area, as well as the lag/long of observed area 304 of FIG. 3. The date and time of the interpretation work 1505 stores the date and time of starting and ending of the interpretation work. Pointers 1507, 1508 and 1509 to automatic classification result table 1510, 1511, and 1512, etc. are stored in a pointer storage region 1506 to the automatic classification result table. The role of pointers 1507, 1508 and 1509 are to correlate each element in the automatic classification result management table to the automatic classification result data. That is, the automatic classification result data can be referred to from the image ID by tracing the pointer. For example, the image whose Image ID is 1 is correlated to the automatic classification result table 1512 by tracing the pointer 1507. An ID of the feature is stored in a feature ID 1513, coordinates where the feature is located are stored in a lag/long of area of feature 1514, the name of feature obtained as a result of the visual interpretation is stored in a name of feature 1515, and the likelihood obtained as a result of the automatic classification is stored in a likelihood 1516, respectively.

Figure 4:
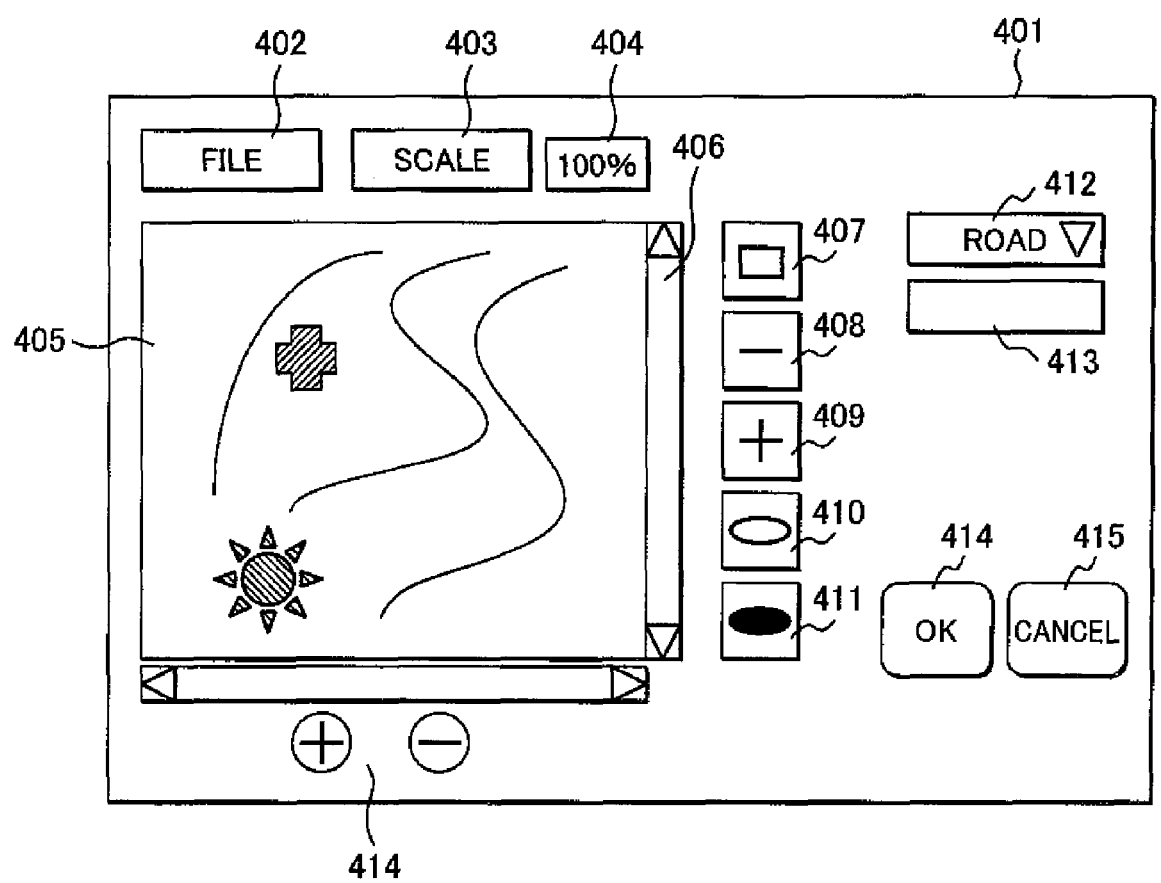
FIG. 4 is a drawing that depicts the example of display screen of interpretation result input device of the first embodiment.

FIG. 4 is a drawing that depicts the example of an image display device 104 and an interpretation result input device 105 under work used in a visual interpretation device 113 of the first embodiment. It is possible to select the image of the object for the interpretation work from a file selection menu 402 in a screen 401 of the interpretation result input device. The selected image is displayed in an image display region 405. The image can be displayed by choosing an appropriate expansion scale from a number of predetermined expansion scales with a display scale selection button 403 to do the interpretation work easily. A display scale input region 404 can input the arbitrary expansion scale from the keyboard. It is also possible to adjust a minute adjustment of the scaling of the image by pushing an expansion and reduction button 414. Moreover, there is scroll bar 406 sideward of the image display region 405, and the image where the feature is reflected can be displayed at an appropriate position by operating the scroll bar 406 with the mouse.

Buttons 407, 408, 409, 410, and 411 are used to set the region of the feature. For example, if the region of the feature is expressed in a rectangle assuming the building, etc. as a feature, the coordinates of the feature are input by drawing the circumscription rectangle of the feature in the image with the mouse after a rectangle region setting button 407 is pushed. Moreover, if the segment like the road is assumed as a feature, the coordinates of the feature are input by selecting the starting point and the terminal point on the road in the image with the mouse after a segment region setting button 408 is pushed. Similarly, a button 409 assumes the case where the feature is expressed by sets of the points. A button 411 assumes the case the feature is expressed by the arbitrary outline, and a button 412 assumes the region of the arbitrary shape.

A feature name selection button 412 chooses the name of feature (that is, the kind of feature that is interpreted from the name) from a number of the predetermined kind of feature. Moreover, it is possible to input directly the name of feature that shows the kind of feature from a name of feature input region 413.

When the interpretation work ends, an OK button 414 is pushed, and the interpretation work is finished. A cancel button 415 is pushed when the interpretation work result is cancelled and the interpretation work is terminated.

When two or more features with the same name of feature exist in one sheet of image, it is also possible to collectively select those features and set the name of feature with the feature name selection button 412 or directly input the name to the name of feature input region 413. A user's load can be reduced as compared with the case to set the name of object to an individual feature by doing like this.

Figure 11:
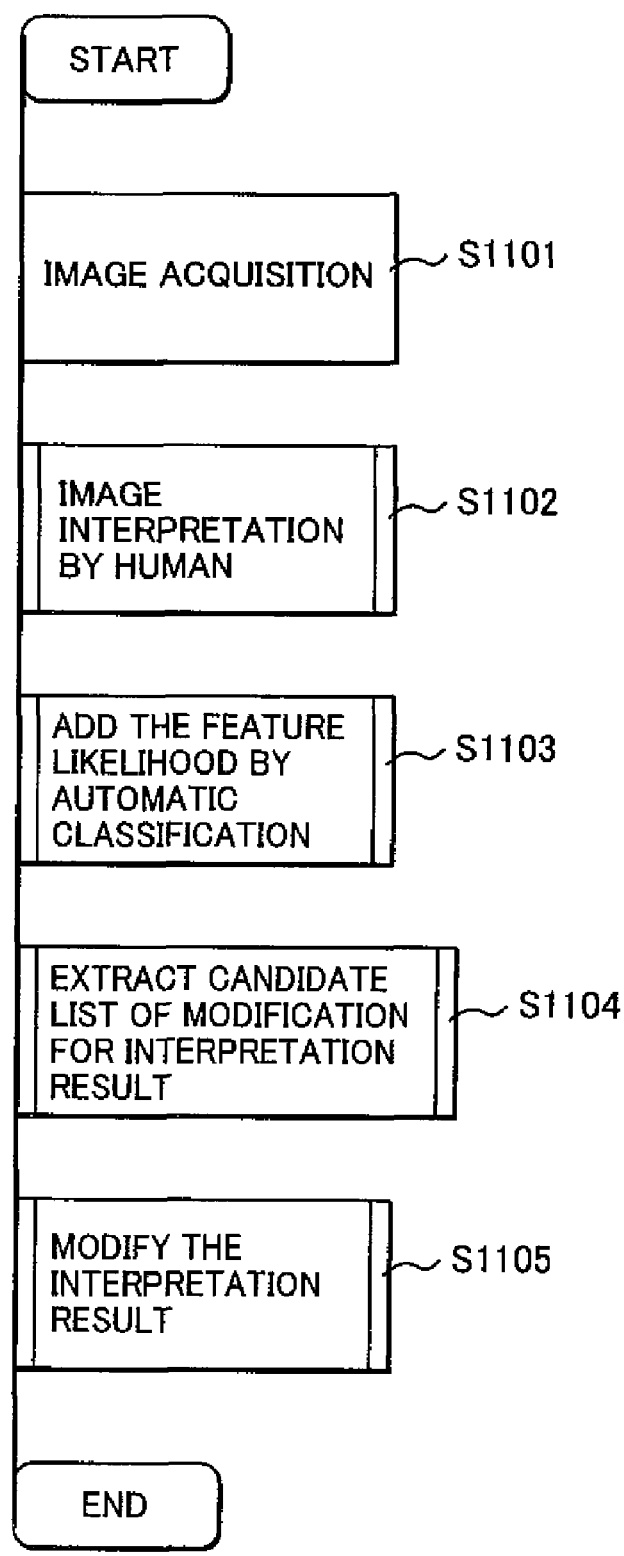
FIG. 11 is a drawing that depicts one example of image interpretation supporting flow of the first embodiment.

FIG. 11 is a drawing that depicts the image interpretation supporting flow of the computer-aided image interpretation device 112 in the first embodiment. The image interpretation supporting flow of the first embodiment is generally described using the FIG. 11 as follows. First of all, the observation target 101 is taken of a picture with the observation sensor 102. The result of taking a picture is stored in the image database 103 (S1101). The stored image is displayed in the image display device 104, and, at first the visual interpretation work is performed by a person with the image display device and the interpretation result input device shown in FIG. 4 (S1102). Next, the likelihood is provided to each feature by the automatic classification (S1103). After that, the extraction of the feature with the possibility to which the visual interpretation result is wrong, that is, a candidate of modification of interpretation result is extracted referring to the likelihood of this automatic classification (S1104). Finally, the interpretation result is modified for the candidate of modification of interpretation result which seems to be necessary to be modified (S1105).

Figure 12:
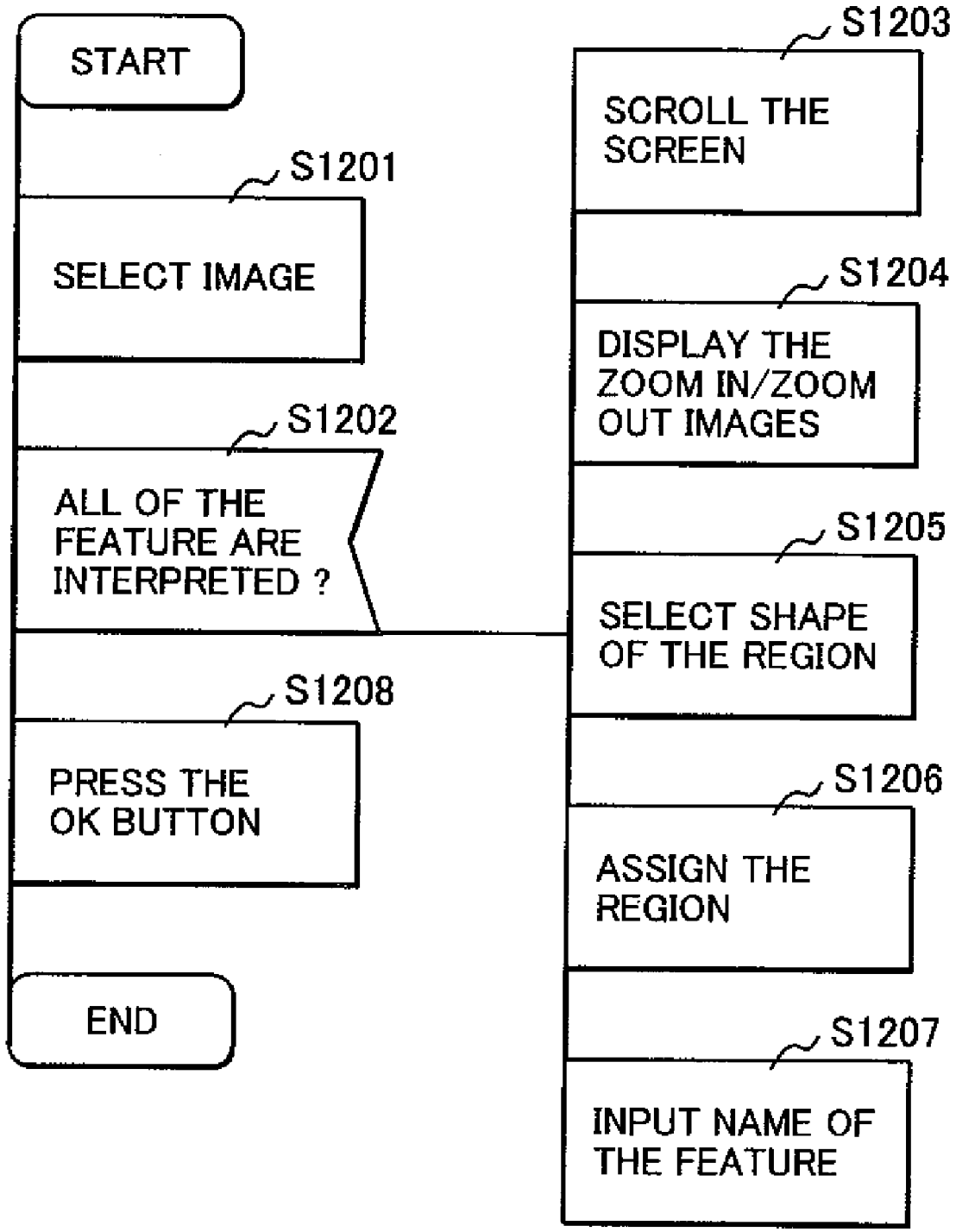
FIG. 12 is a drawing that depicts one example of the image interpretation work flow of the first embodiment.

FIG. 12 is a drawing that depicts one illustrative example of the process flow of the visual interpretation (S1102 of FIG. 11) in the above-mentioned image interpretation supporting flow. The image interpretation flow is described referring to the FIG. 12, as follows. First of all, the image that is the object of the image interpretation is selected from the image database 103 (S1201). Next, all features included in the selected image are interpreted (S1202). The display area of the image is adjusted as necessary by a scroll bar 406 so that the feature is included in an image display region 405 shown in FIG. 4, in the interpretation of the feature (S1203). Next, the image is expanded or reduced to be displayed as necessary, by pushing the display scale selection button 403 or directly inputting the magnification to the display scale input region 404 so that the interpretation is easily performed (S1204). The feature region shape setting buttons 407, 408, 409, 410 and 411 are selected (S1205) and the feature region is enclosed with a pointing device such as the mouse, etc. (S1206), depending on the shape of the feature. And the name of the selected feature is input (S1207).

Figure 14:
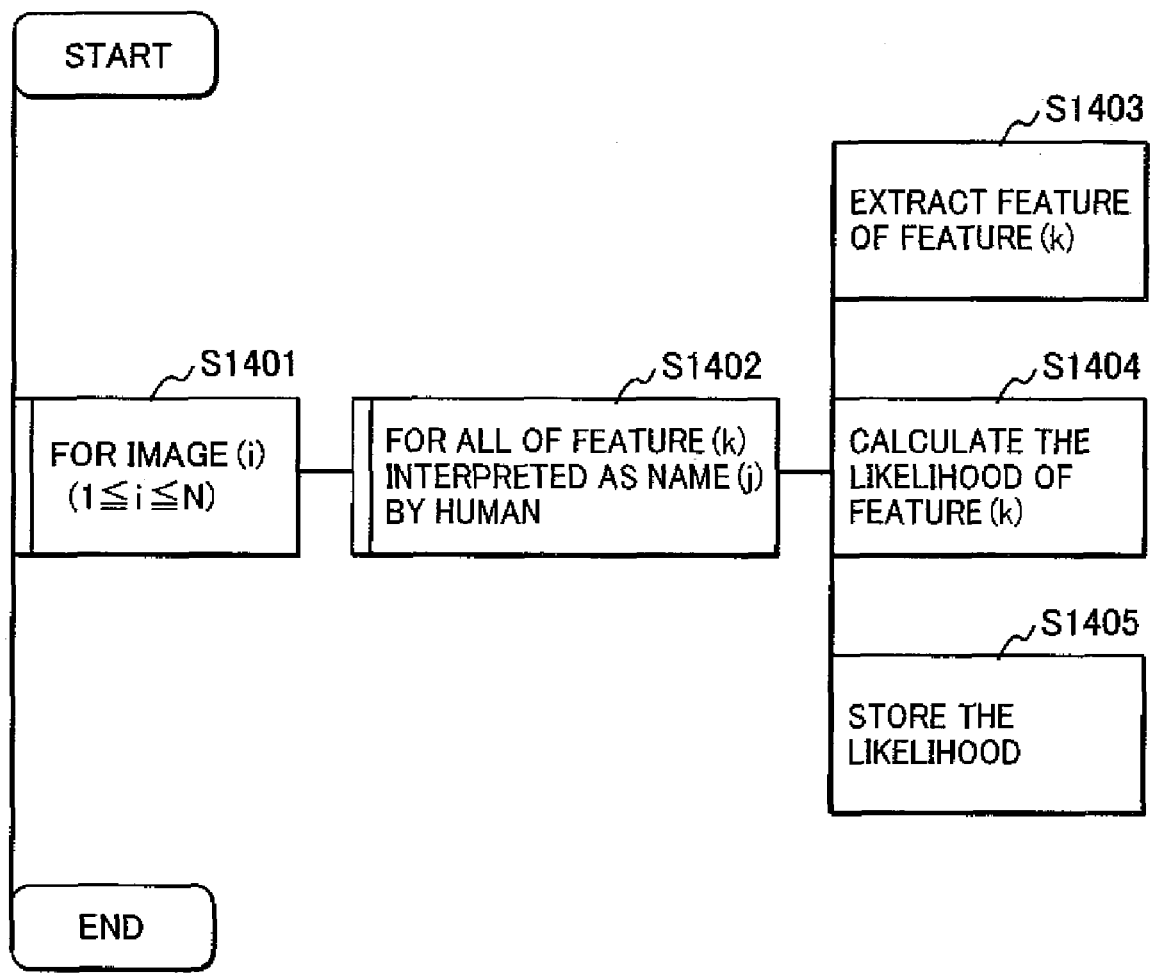
FIG. 14 is a drawing that depicts one example of the process flow when the likelihood is provided to a feature by the automatic classification of the first embodiment.

FIG. 14 is a drawing that depicts one illustrative example of the flow of process (S1103 of FIG. 11) to provide the likelihood to the feature by the automatic classification in the above-mentioned image interpretation supporting flow. The process flow is described referring to the FIG. 14, as follows. Here, the following process is performed for an ith image (1≦i≦N), assuming that the interpretation result data of N piece is included in the image interpretation result database 106 (S1401). While all features included in the ith interpretation result data are examined, all features that the user interpreted are searched if the name of feature is j (S1402). The characteristic amount is extracted from the image for each feature k (1≦k≦M) (S1403). Here, M is the number of features included in the ith interpretation result data. Next, the likelihood of the name of feature k is calculated referring to interpretation result database 106. For example, the extraction technique of the characteristic amount and the computing method of likelihood are disclosed in Computer Image Processing pp. 251 to 286 by Hideyuki Tamura (December 2002, Ohmsha). Finally, the calculated likelihood is stored in the likelihood 1516 of the automatic classification result management table 1501 shown in FIG. 15.

In S1104 of FIG. 11, the means for extracting candidate of modification of interpretation result 107 of FIG. 1 extracts only the feature whose likelihood 1516 of the automatic classification result management table 1501 is smaller than the predetermined threshold as a candidate of modification of interpretation result, and sends it to the display device for candidate of modification of interpretation result 108.

Figure 13:
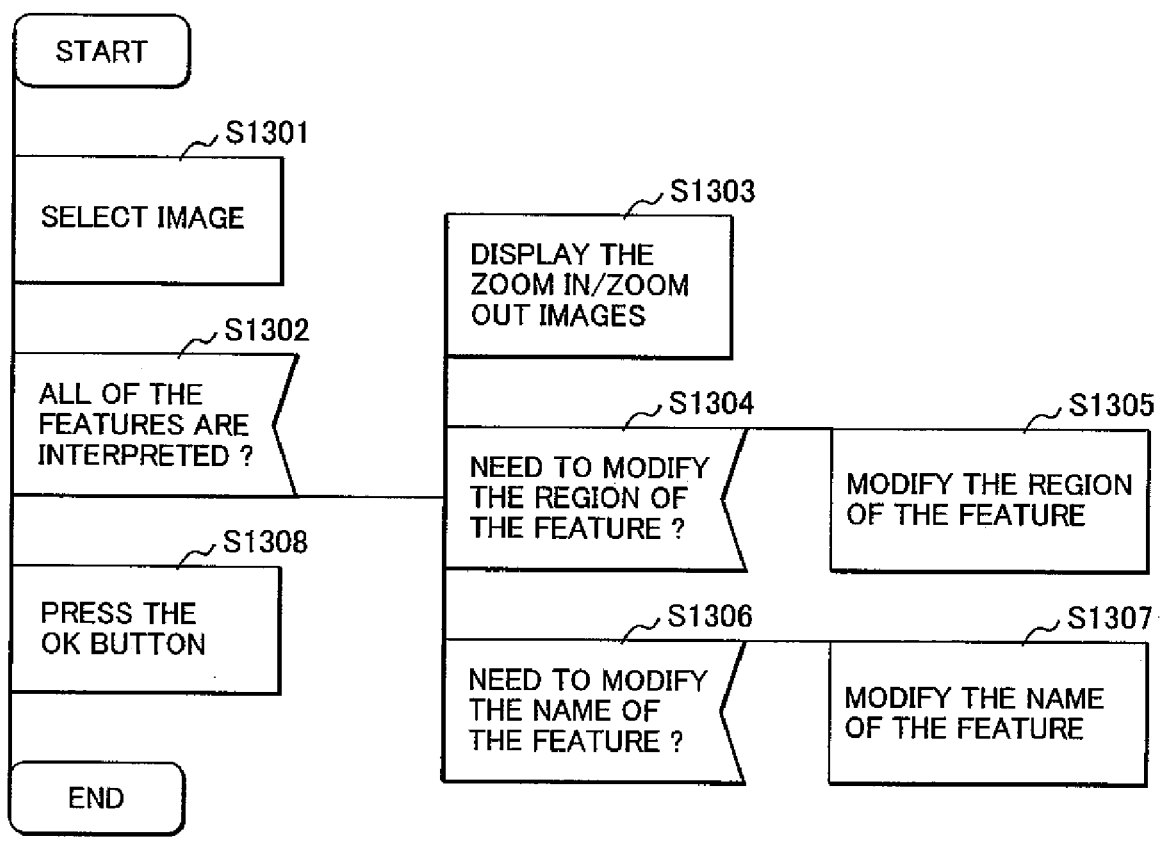
FIG. 13 is a drawing that depicts one example of the image reinterpretation work flow of the first embodiment.

FIG. 13 is a drawing that depicts one example of the flow of the interpretation result modification work (S1105 of FIG. 11) in the first embodiment. The flow of the interpretation result modification work is described referring to FIG. 13, as follows. In the flow of the interpretation result modification work, the display and the keyboard, etc. that are the interfaces of the visual interpretation supporting device shown in FIG. 4 can be used, as described in the above. First of all, the image that is displayed in the display device for candidate of modification of interpretation result 108, and includes the candidate of modification of interpretation result extracted by the means for extracting candidate of modification of interpretation result 107, is selected (S1301). Next, the modification work is performed by the input device for modifying interpretation result 109 for all candidates of modification of interpretation results included in the image (S1302). In the modification work, display expansion and reduction of the image are performed as necessary, and the image is displayed on the display by the reduced scale to which the person easily interpreted the features (Sl303).

Next, it is judged whether the modification of the feature region is necessary (S1304), and if it is necessary, the modification of the feature region is performed (S1305). If the shape needs to change in order to specify the feature region, the shape is modified by pushing feature region shape setting buttons 407, 408, 409, 410, and 411. In addition, the user compares the interpretation result with the image, and judges whether the modification of the name of feature that shows the kind of feature is necessary (S1306). If necessary, the user interprets the name of feature (S1307). When the modification work is performed, a name of feature 315 of an interpretation result table 310 is overwritten with the modified name of feature.

Since the candidate of modification of interpretation result, that is, the candidate with high possibility to which the interpretation result of the feature is wrong, can be efficiently extracted, the interpretation result with high accuracy can be easily obtained, by the configuration like this.

Next, the illustrative example for the efficiency enhancement by the first embodiment is illustrated. The time required to obtain a highly accurate interpretation result can be estimated by doing as follows for example. That is, it is assumed that 10000 features are taken in a picture in the remote sensing image of ten kilometers×ten kilometers, and 5% of the features are interpreted by mistake in the first visual interpretation, and the mistake is assumed to reduce by half in reviewing the interpretation result. In this case, there are 500 mistakes in the first interpretation, 250 mistakes in the second interpretation, and 125 mistakes in the third interpretation, etc., thus a total of ten interpretations are needed to reduce mistakes of the interpretation to 0. In each interpretation, the whole area of the remote sensing image of ten kilometer×ten kilometers should be visually interpreted. That is, the visual interpretation work of the feature of total 10000×10 times=100000 is needed.

On the other hand, in the method of the first embodiment, the interpretation result may be reviewed only for the feature of 500 sites in the second interpretation, and the interpretation result may be reviewed only for the feature of 250 sites in the third interpretation. Therefore, it will end with the visual interpretation work of 10000+500+250+ . . . =11000 features until mistakes are reduced to 0. Therefore, it can be finished with working hours of about ⅑ as compared with the case to repeat the visual interpretation.

The above-mentioned first embodiment describes for a still image but a similar effect can be achieved for a dynamic image. Moreover, in the first embodiment, it describes on the assumption that the Earth's surface is observed, but the present invention is not limited to this embodiment. For example, it is applicable in the spaceship for the planetary exploration, etc.

Second Embodiment

Next, the second embodiment is described. In the following, it will be described for the difference with the first embodiment. In the second embodiment, the automatic classification is executed before the visual interpretation, unlike the first embodiment.

Figure 16:
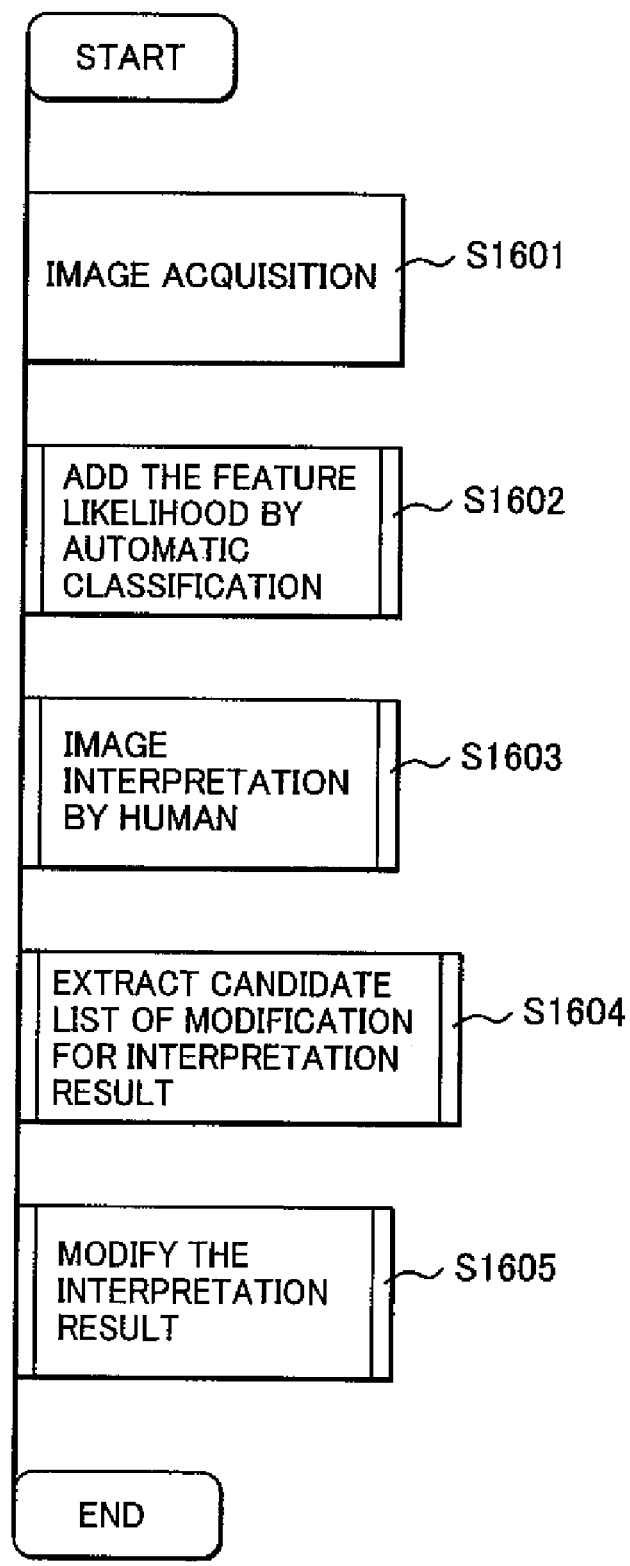
FIG. 16 is a drawing that depicts one example of the image interpretation supporting flow of the second embodiment.

FIG. 16 is a drawing that depicts the image interpretation supporting flow in the second embodiment. The image interpretation supporting flow is outlined referring to FIG. 16, as follows. First of all, the observation target 101 is taken of a picture with the observation sensor 102. The result of taking a picture is stored in the image database 103 (S1601). The feature that is taken of the picture in the image is automatically classified and the similarity is provided to each feature (S1602). The image is displayed in the image display device 104, and the visual interpretation work is performed by humans with the image display device and the interpretation result input device shown in FIG. 4 (S1603). After that, the feature with a possibly wrong visual interpretation result, that is, the modification candidate of the interpretation result, is extracted by referring to the similarity by the above-mentioned automatic classification (S1604). Finally, the visual interpretation result is modified for the candidate which seems to be necessary to be modified (S1605).

Figures 5, 6:
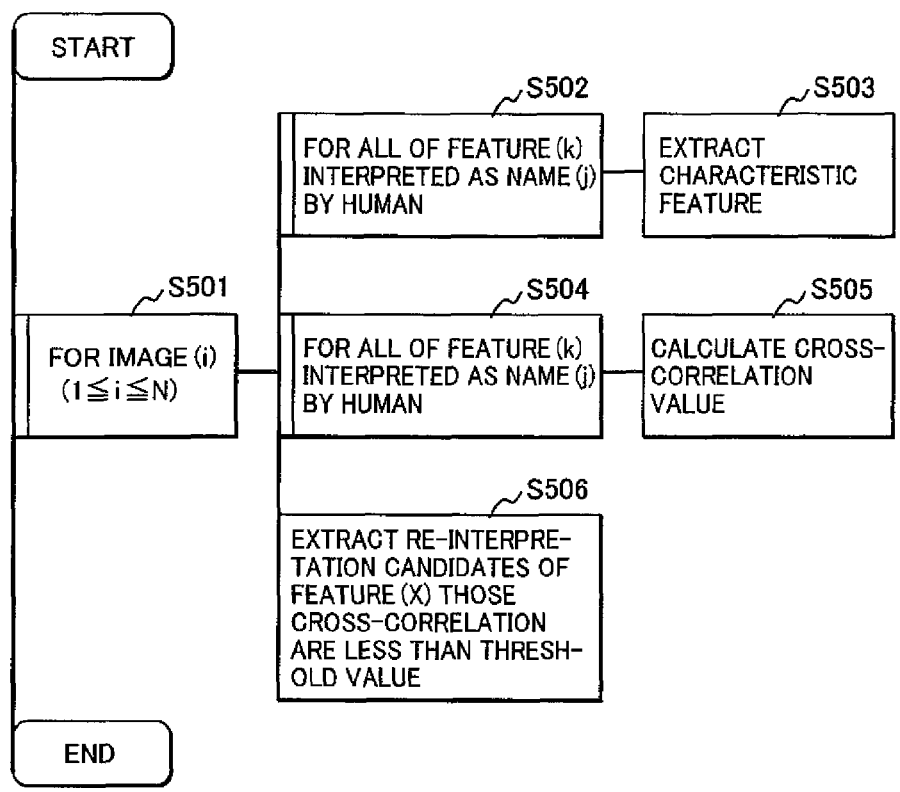
FIG. 5 is a drawing that depicts one example of processing flow by a means for extracting candidate of modification of interpretation result 107 of the first embodiment.
FIG. 6 is a drawing that depicts one example of the cross-correlation matrix that lists the degree of correlation of the features in the first embodiment.

FIG. 5 is a drawing that depicts one example of process flow (S1604) for extracting candidate of modification of interpretation result. The flow for extracting candidate of modification of interpretation result is described referring to the FIG. 5, as follows. Here, assuming that the interpretation result table of N piece is contained in the image interpretation result database 106, and the following process is performed for ith image (1≦i≦N) (S501). When the name of feature is j, all features that the user interpreted are searched, while examining all features included in the interpretation result data of ith image (S502). The amount of characteristic is extracted from the image for each feature k (1≦k≦M) (S503). Here, M is the number of features included in the ith interpretation result data. Next, the similarity between the features that the name of feature k is interpreted to j is calculated, referring to the interpretation result database 106 (S504 and S505).

The cross-correlation value from the pixel value is used in the present example for a specific calculation method of the similarity, but the amount of characteristics of spectrum, texture, and luminance distribution, etc. may be used. Moreover, the total length and the total width of the feature may be used, too. The following describes the example of the cross-correlation value. The cross-correlation value is calculated from pixel value of the partial picture pierced with a prescribed size from the remote sensing image. For example, the method of calculating the cross-correlation value is disclosed in the above-mentioned Computer Image Processing pp. 252 to 254 by Hideyuki Tamura. Finally, feature x whose cross-correlation value is less than the threshold is extracted (S506) and they are output as a candidate of modification of interpretation result. The structure of data that stores the candidate of modification of interpretation result can use the interpretation result table 310.

When the number of target features for the automatic classification is limited, the likelihood can be used in S1602 instead of the similarity. In the process flow for extracting candidate of modification of interpretation result (S1604) of this case, "Calculate cross-correlation value" of S505 in FIG. 5 is substituted with "Calculate likelihood", and "Extracts feature x whose cross-correlation value is less than threshold as reinterpretation candidate" of S506 is substituted with "Extracts feature x whose likelihood is less than threshold as reinterpretation candidate", respectively.

FIG. 6 is a drawing that shows one example of the cross-correlation value. In this example, the correlation value in each kind of four features is calculated and the calculated value is stored in each measure. For example, the cross-correlation of feature ID2 with the feature 1 is 0.9, which is comparatively high, and the correlation of feature ID3 with feature ID1 is 0.8.

In the above-mentioned configuration, the cross-correlation value is calculated by the means for extracting candidate of modification of interpretation result 107 assuming that all features are subject to possible interpretation result modification to require the similarity between the features, but it is not limited to the second embodiment. For example, it is possible to calculate the cross-correlation value only with the feature that the user specified.

It is possible for the feature that the user missed in the first interpretation work to be presented to the user as a candidate of modification of interpretation result by composing like this. As a result, a highly accurate interpretation result can be efficiently obtained.

Third Embodiment

Figure 7:
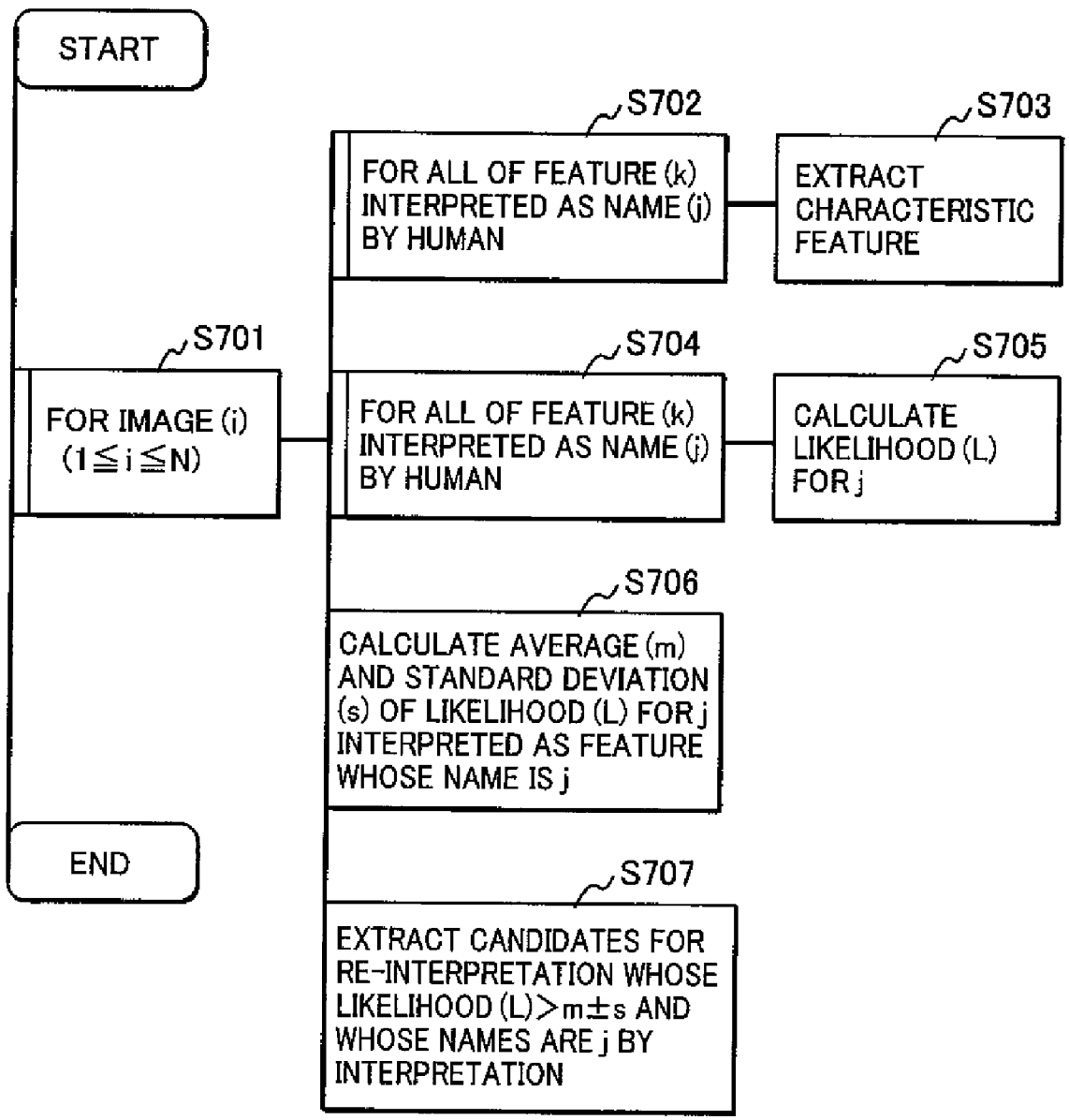
FIG. 7 is a drawing that depicts one example of process flow by means for extracting candidate of modification of interpretation result 107 of a third embodiment.

Next, the third embodiment is described below. In the following, the difference with the first embodiment will be described. FIG. 7 shows one exemplary flow of the means for extracting candidate of modification of interpretation result 107 of the computer-aided image interpretation device related to the third embodiment.

Here, assuming that the interpretation result data of N piece is included in the interpretation result database 106, the following process is performed for the ith image (1≦i≦N) (S701). When the name of feature is j, all features that the user interpreted are searched, while examining all features included in the interpretation result data of ith image (S702). The amount of characteristic is extracted from the image for each feature k (1≦k≦M) (S703). Here, M is the number of features included in the ith interpretation result data.

Next, the likelihood L that the name of feature k seems to be the name j of feature is calculated, referring to the interpretation result database 106 (S705). For example, the method using Template Matching (above-mentioned Computer Image Processing by Hideyuki Tamura, Ohmsha, and pp. 259 to 260) and the methods of statistically classifying the object (above-mentioned Computer Image Processing by Hideyuki Tamura, Ohmsha, pp. 271 to 281), etc. can be used as a method of calculating the likelihood L. Next, an average m of likelihood L that the name of feature k seems to be j and a standard deviation s are calculated. Finally, feature x that becomes m−s<likelihood L<m+s is output as the candidate of modification of interpretation result. The candidate of modification of interpretation result is expressible by the same data format as the interpretation result table 310.

Figure 8:
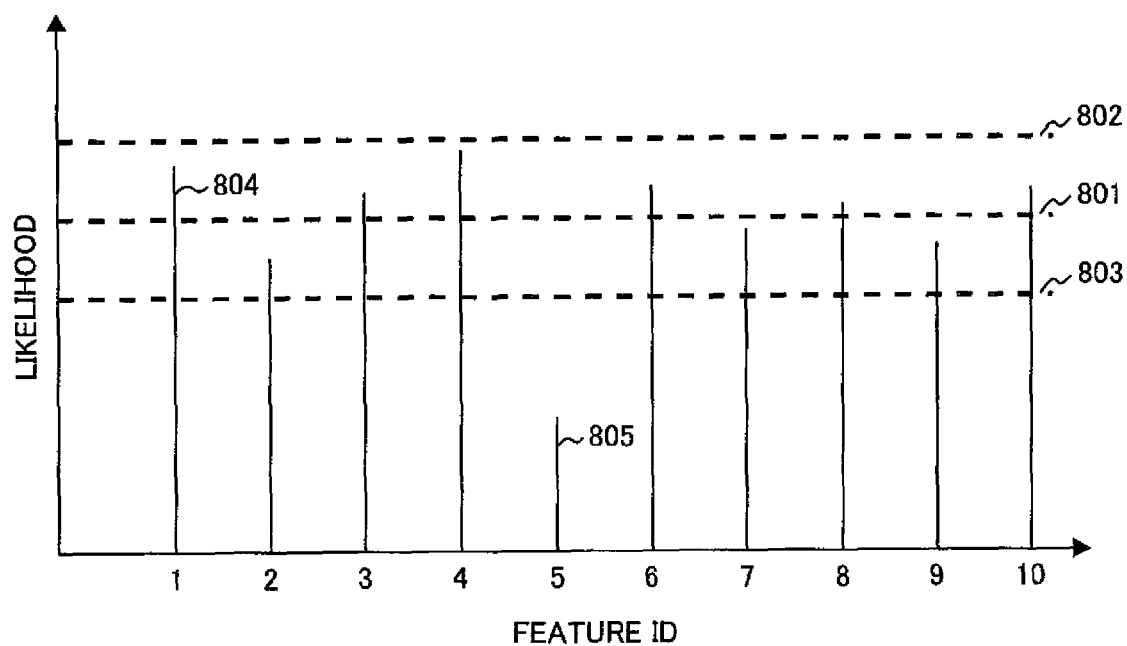
FIG. 8 is a drawing that depicts the variation condition of the classification result of the feature in the third embodiment.

FIG. 8 is the drawing when the result of calculating likelihood L by the automatic classification is set for two or more features that are judged to have the same name of feature as a result of the interpretation. The horizontal axis shows the ID of feature and the longitudinal axis shows the likelihood. In the FIG. 8, 801 shows the average m of likelihood, 802 shows average m of likelihood+standard deviation s and 803 shows average m of likelihood−standard deviation s, respectively. 804 shows the feature whose likelihood L stays between the average of the likelihood m±the standard deviations s, and 805 shows the feature whose likelihood L is outside of m±s, respectively.

In the above-mentioned method, the acceptable range of the likelihood of the feature is expressed with the difference from the standard deviation and the average of the likelihood, but it is not limited to this method. For example, the method of the robust estimation (Mikio Takagi, Handbook of Image Analysis, University of Tokyo Press, 2004), etc. can be used, too. Moreover, the likelihood of the feature may be set based on the acceptable range that the user has provided beforehand.

Moreover, the likeliness is calculated by the means for extracting candidate of modification of interpretation result 107 assuming that all features are subject to possible interpretation result modification, but it is not limited to this embodiment. For example, the degree of similarity only with the feature that the user specified may be calculated.

It is possible for the feature that the user missed in the first interpretation work to be presented to the user as a candidate of modification of interpretation result by composing like this. As a result, a highly accurate interpretation result can be efficiently obtained.

Fourth Embodiment

Figure 9:
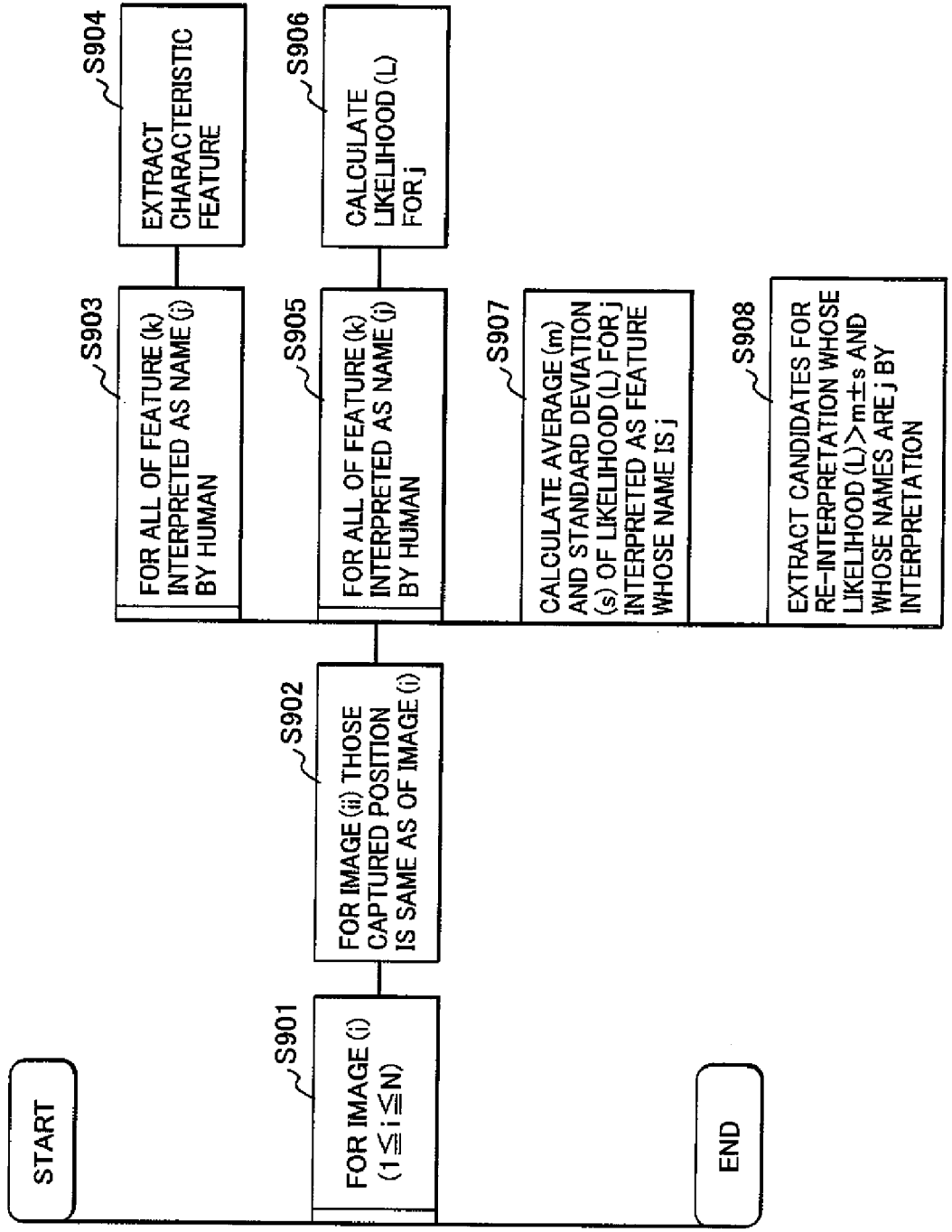
FIG. 9 is a drawing that depicts one example of process flow by a means for extracting candidate of modification of interpretation result 107 of a fourth embodiment.

Next, the fourth embodiment is described. In the following, the difference with the first embodiment will be described. FIG. 9 shows the flow of the means for extracting candidate of modification of interpretation result 107 in the computer-aided image interpretation device related to the fourth embodiment. In the fourth embodiment, the remote sensing image taken of a picture in the vicinity of the same date and time of observation is retrieved in reference to the image database 103, the feature interpreted as the same feature from the plural remote sensing images is extracted, and it is used for the judging criteria by which the candidate of modification of interpretation result is extracted.

That is, assuming that N pieces of the interpretation result data are included in the image interpretation result database

106, the following process is performed for the ith image (1≦i≦N) (S901). The following process is performed for all images ii at the same date and time of observation referring to the ith interpretation result data (S902). It is searched for all features that the user interpreted as the feature whose name is j, while examining all features included in the interpretation result for the image ii (S903). The amount of characteristic is extracted from the image for each feature k (1≦k≦M) (S904). Here, M is the number of features included in the ith interpretation result data.

Next, the likelihood L that the name of feature k seems to be the name j of feature is calculated, referring to the interpretation result database 106 (S906). The method similar to the explanation of FIG. 5 may be used, as a method of calculating likelihood L. Next, an average m of likelihood L that the name of interpreted feature k seems to be j and the name of feature j, and a standard deviation s are calculated (S907). Finally, feature x that becomes m−s<likelihood L<m+s is output as the candidate of modification of interpretation result (S908). The modification of interpretation result can be expressed in the same data format as the interpretation result table 310.

Since average value m and standard deviation s of the likelihood can be calculated using more features by composing like this, the interpretation result modification can be extracted with stability.

The reason to narrow down only to the images which the date and time of observation of the image are close is that the change of image is small in the images which the date and time of observation are close, thus the possibility to be visually interpreted or automatically classified as a same feature for the same feature is high, and the accuracy of the calculation for the variation in the likelihood increases.

It is possible to appropriately provide for the neighborhood of the date and time of observation of an image according to what feature is interpreted. For example, if roads, railways, bridges, and buildings, etc. are assumed as features, it can be considered that the change in the image is small for the long period in which they are constructed and it is possible to provide from several months to several years. Moreover, assuming moving objects such as aircrafts, ocean vessels, vehicles, and trains, etc., it is possible to provide for from several hours to several days for example, according to the movement speed.

In the above-mentioned explanation, the difference with the first embodiment was described. The implementation method that uses the flow shown in FIG. 16 instead of the flow shown in FIG. 11 as the image interpretation supporting flow can be considered.

Fifth Embodiment

Figure 10:
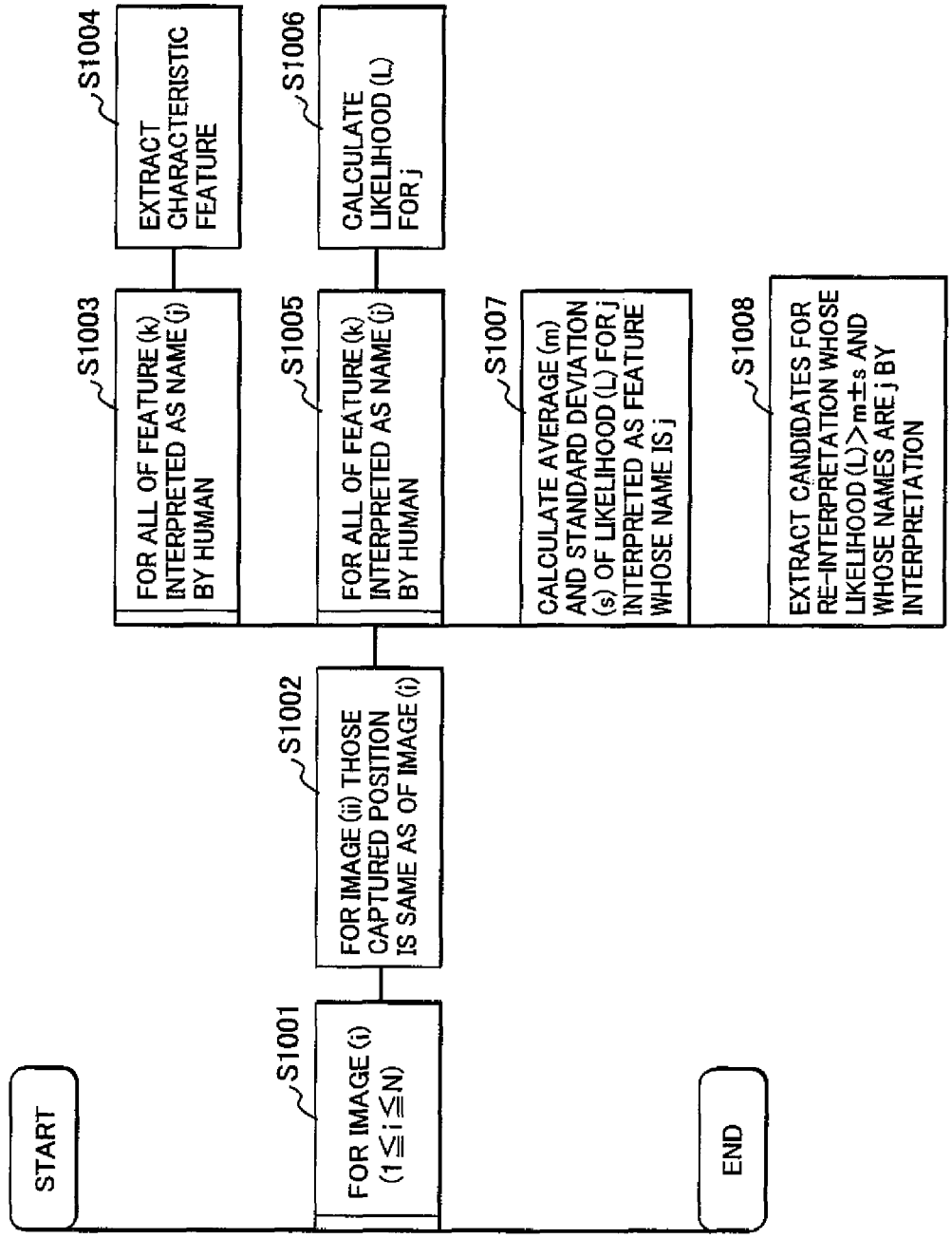
FIG. 10 is a drawing that depicts one example of process flow of a means for extracting candidate of modification of interpretation result 107 of a fifth embodiment.

FIG. 10 shows one exemplary flow of the means for extracting candidate of modification of interpretation result 107 in the computer-aided image interpretation device related to the fifth embodiment. In the following, it will be described for the difference with the first embodiment. In the fifth embodiment, the remote sensing image taken of a picture in the vicinity of the same position of observation is retrieved in reference to the image database 103, the feature interpreted as the same feature from those plural remote sensing images is extracted, and it is used for the judging criteria by which the candidate of modification of interpretation result is extracted.

That is, assuming that N pieces of the interpretation result data are included in the image interpretation result database 106, the following process is performed for the ith image (1≦i≦N) (S1001). The following process is performed for all images ii at the vicinity of position of observation referring to the ith interpretation result data (S1002). It is searched for all features that the user interpreted as the feature whose name is j, while examining all features included in the interpretation result for the image ii (S1003). The amount of characteristic is extracted from the image to each feature k (1≦k≦M) (S1004). Here, M is the number of features included in the ith interpretation result data. Next, the likelihood L that the name of feature k seems to be the name j of feature is calculated, referring to the interpretation result database 106 (S1006). The method similar to the explanation of FIG. 5 may be used, as a method of calculating likelihood L. Next, an average m of likelihood L that the name of interpreted feature k seems to be j and the name of feature j, and a standard deviation s are calculated (S1007). Finally, feature x that becomes m−s<likelihood L<m+s is output as the candidate of modification of interpretation result (S1008). The candidate of modification of interpretation result is expressible using the interpretation result table 310.

Since average value m and standard deviation s of the likelihood can be calculated using more features by composing like this, the candidate of modification of the interpretation result can be extracted with stability.

The reason to narrow down only to the images which the position of observation of the image are close is that the change of image is small in the images which the position of observation are close, the possibility to be visually interpreted or automatically classified as a same feature for the same feature is high, and the accuracy of the calculation for the variation in the likelihood increases. It is also because the same feature is likely to be included with respect to big features such as roads, railways, bridges, etc.

Regarding the closeness of the position of observation of image, it may be appropriately interpreted according to the subject feature. If roads, railways, bridges, and buildings, etc. are assumed as features, it is possible to provide for from several meters to several kilometers including those features, for example. Moreover, assuming moving objects such as aircrafts, ocean vessels, vehicles, and trains, and etc., it is possible to provide for from several meters to tens of meters for example, according to the size of the moving object.

In the above-mentioned explanation, it is described to narrow down in the image taken of a picture at the vicinity of position of observation, but it can also be considered to further narrow down with the date and time of observation as described in the fourth embodiment.

Moreover, in the above-mentioned explanation, the difference with the first embodiment has been described. The implementation method that uses the flow shown in FIG. 16 instead of the flow shown in FIG. 11 as the image interpretation supporting flow can be considered.

What is claimed is:

1. A computer-aided image interpretation method in a device that has a processing unit and which interprets a plurality of features from a sensing image, the method comprising:

correlating an interpretation result of interpreting a kind of each of the features to a position in the sensing image, and storing the interpretation result and the position; and correlating an automatic classification result of automatically classifying the kind of each of the features from the sensing image in the processing unit to a likelihood and the position in the sensing image, and storing the automatic classification result, the likelihood, and the position, wherein the processing unit:
extracts a plurality of the features which are interpreted as a same kind of the feature from the interpretation result;
obtains the position of each of the extracted features based on the interpretation result;
extracts the interpretation result having a peculiar likelihood from the interpretation result; and
outputs the interpretation result having the peculiar likelihood as a candidate of modification of the interpretation result.

2. The computer-aided image interpretation method according to claim 1, wherein the features are classified by one of spectral characteristics, radiometric characteristics, diffuse characteristics, textures and shapes, or combinations thereof from the sensing image, in the automatic classification.

3. The computer-aided image interpretation method according to claim 1,
wherein the interpretation result is correlated to a date and time of observation of the sensing image and stored, when the interpretation result is correlated to the position in the sensing image and stored; and the processing unit calculates variation in the likelihood from the same kind of feature included in two or more sensing images in which the date and time of observation are close.

4. The computer-aided image interpretation method according to claim 1,
wherein the interpretation result is correlated to a position of observation of the sensing image and stored, when the interpretation result is correlated to the position in the sensing image and stored; and the processing unit calculates variation in the likelihood from the same kind of feature included in two or more sensing images in which the position of observation is close.

5. A computer-aided image interpretation method in a device that has a processing unit and which interprets a plurality of features from a sensing image, the method comprising:
correlating an interpretation result of interpreting a kind of each of the features from the sensing image to a position in the sensing image, and storing the interpretation result and the position; and
correlating an automatic classification result of automatically classifying the kind of each of the features from the sensing image by the processing unit to a similarity or a likelihood and the position in the sensing image, and storing the automatic classification result, the similarity or the likelihood, and the position,
wherein the processing unit:
obtains the position of the feature, whose likelihood is equal to or less than a prescribed threshold, or whose similarity is quite different from similarities of the other features, based on the automatic classification result; and
outputs the interpretation result at the obtained position as a candidate of modification of the interpretation result.

6. A computer-aided image interpretation device which supports interpretation of a plurality of features from a sensing image, the device including a memory unit, a processing unit, and a display unit,
wherein the memory unit stores an interpretation result of interpreting a kind of each of the features as data correlated to a position of the features in the sensing image, and further stores a result of automatically classifying the kind of each of the features from the sensing image in the processing unit as data correlated to similarities or likelihoods of the features and the positions of the features in the sensing image;
wherein the processing unit:
extracts a plurality of the features which are interpreted as a same kind of the feature from the interpretation result;
obtains the position of each of the extracted features based on the interpretation result;
extracts the interpretation result having a peculiar likelihood from the interpretation result; and
outputs the interpretation result having the peculiar likelihood as a candidate of modification of the interpretation result.

7. The computer-aided image interpretation device according to claim 6, wherein the processing unit classifies the features by one of spectral characteristics, radiometric characteristics, diffuse characteristics, textures and shapes, or combinations thereof from the sensing image, in the automatic classification.

8. The computer-aided image interpretation device according to claim 6, wherein the processing unit uses cross-correlation values from pixel values of the features of the sensing image, as the similarities.

9. The computer-aided image interpretation device according to claim 6, wherein the processing unit retrieves the likelihood of the feature from the automatic classification result classified automatically based on the position of the feature which is interpreted as the same kind of feature in the interpretation result; examines variation in the likelihood of the feature; extracts the feature with a peculiar likelihood from the interpretation result; and outputs the extracted feature having the peculiar likelihood as a candidate of modification of interpretation to the display unit.

10. The computer-aided image interpretation device according to claim 6, wherein the processing unit retrieves the interpretation result based on the position of at least one of the features whose likelihood is equal to or less than a prescribed threshold or one of the features whose similarity is quite different from similarities of the other features, in the automatic classification result; extracts the feature with a different interpretation result, and presents the feature as a candidate of modification of interpretation to the display unit.

11. The computer-aided image interpretation device according to claim 6, wherein the memory unit correlates the interpretation result to the date and time of observation of the sensing image and stores the interpretation result; and the processing unit extracts the feature having the peculiar likelihood from the same kind of feature included in the images in which the date and time of observation are close, and outputs the feature as the candidate of modification of interpretation to the display unit.

12. The computer-aided image interpretation device according to claim 6, wherein the memory unit correlates the interpretation result to a position of observation of the sensing image and stores the interpretation result; and the processing unit extracts the feature having the peculiar likelihood from the same kind of feature included in the two or more sensing images in which the position of observation is close, and outputs the feature as the candidate of modification of interpretation to the display unit.

* * * * *